(12) United States Patent
Chen et al.

(10) Patent No.: US 10,713,096 B2
(45) Date of Patent: Jul. 14, 2020

(54) SYSTEM AND METHOD FOR HANDLING DATA SKEW AT RUN TIME

(71) Applicants: Beijing Jingdong Shangke Information Technology Co., Ltd., Beijing (CN); JD.com American Technologies Corporation, Mountain View, CA (US)

(72) Inventors: Shouwei Chen, Fremont, CA (US); Wensheng Wang, Santa Clara, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 0 days.

(21) Appl. No.: 16/164,756

(22) Filed: Oct. 18, 2018

(65) Prior Publication Data
US 2020/0125417 A1 Apr. 23, 2020

(51) Int. Cl.
| | |
|---|---|
| *G06F 15/16* | (2006.01) |
| *G06F 9/50* | (2006.01) |
| *G06F 3/06* | (2006.01) |
| *G06F 9/38* | (2018.01) |

(52) U.S. Cl.
CPC .......... *G06F 9/5072* (2013.01); *G06F 3/0613* (2013.01); *G06F 3/0644* (2013.01); *G06F 3/0685* (2013.01); *G06F 9/38* (2013.01); *G06F 9/5044* (2013.01); *G06F 9/5066* (2013.01); *G06F 9/5077* (2013.01)

(58) Field of Classification Search
CPC .... G06F 9/5072; G06F 9/5066; G06F 9/5044; G06F 9/5077; G06F 9/38; G06F 3/0685; G06F 3/0644; G06F 3/0613
See application file for complete search history.

(56) References Cited

U.S. PATENT DOCUMENTS

| | | | | |
|---|---|---|---|---|
| 8,799,272 | B2 * | 8/2014 | Al-Omari | G06F 16/2456 707/718 |
| 2004/0022083 | A1 * | 2/2004 | Jung | G11C 5/025 365/63 |

(Continued)

OTHER PUBLICATIONS

Gufler, B., Augsten, N., Reiser, A. and Kemper, A., Handling Data Skew in MapReduce, Closer'11, 2011, pp. 574-583.

(Continued)

*Primary Examiner* — Richard G Keehn
(74) *Attorney, Agent, or Firm* — China Science Patent & Trademark US LLC (57) ABSTRACT

A system for handling data skew includes a cluster of computing nodes and a processor. The cluster includes one or more first nodes, each of which has a storage, and one or more second nodes, each of which has a storage. The storage of the respective second nodes has a higher access speed than the storage of the respective first nodes. The processor is configured to split input data into partitions of the input data, to detect if any of the partitions has data skew, and to assign ones of the partitions, which are detected as having no data skew, to the first nodes, and ones of the partitions, which are detected as having the data skew, to the second nodes, for parallel processing.

18 Claims, 9 Drawing Sheets

(56) References Cited

U.S. PATENT DOCUMENTS

| | | | | |
|---|---|---|---|---|
| 2008/0071721 A1* | 3/2008 | Wang | .................... | G06N 20/00 |
| | | | | 706/48 |
| 2012/0224277 A1* | 9/2012 | Steiner | .................. | G11B 5/012 |
| | | | | 360/32 |
| 2013/0179631 A1* | 7/2013 | Cepulis | ................ | G06F 3/0616 |
| | | | | 711/103 |
| 2013/0254196 A1* | 9/2013 | Babu | ................ | G06F 11/3404 |
| | | | | 707/736 |
| 2014/0379985 A1* | 12/2014 | Barber | ............... | G06F 12/0811 |
| | | | | 711/122 |
| 2015/0160889 A1* | 6/2015 | Beeson | ................ | G06F 3/0659 |
| | | | | 711/114 |
| 2015/0160891 A1* | 6/2015 | Beeson | ................ | G06F 3/0613 |
| | | | | 711/117 |
| 2015/0324125 A1* | 11/2015 | Li | ........................ | G06F 3/0631 |
| | | | | 711/103 |
| 2015/0331724 A1* | 11/2015 | Sahu | .................... | G06F 9/5083 |
| | | | | 718/104 |
| 2016/0239528 A1* | 8/2016 | Pemberton | .............. | G06F 16/21 |
| 2016/0277542 A1* | 9/2016 | Bhatia | ................ | H04L 67/1014 |
| 2018/0182381 A1* | 6/2018 | Singh | ................. | G06F 17/2775 |

OTHER PUBLICATIONS

Xu, Y and Kostamaa, P, A new algorithm for small-large table outer joins in parallel DBMS, IEEE 26th Int. Conf. Data Engineering, 2010, pp. 1018-1024.

Cheng, L., and Kotoulas, S, Efficient skew handling for outer joins in a cloud computing environment, IEEE Transactions on Cloud Computing, 2015.

* cited by examiner

SYSTEM AND METHOD FOR HANDLING DATA SKEW AT RUN TIME

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to the field of Big Data, and more particularly to systems and methods of handling data skew in Big Data frameworks at run time.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the increasing volume and high complexity of data, data skew is a common occurrence in large scale Big Data processing. Since most Big Data frameworks leverage a synchronous distributed computing model, the data skew will significantly increase execution time of Big Data applications. In some serious cases, the applications cannot even finish because of the data skew. Furthermore, data distribution in a corporation varies every day, while most of the existing solutions cannot solve the data skew issue at run time.

Therefore, an unaddressed need exists in the art to address the aforementioned deficiencies and inadequacies.

SUMMARY

In one aspect, the disclosure is directed to a system for handling data skew at run time. In certain embodiments, the system includes a plurality of computing devices defining a cluster of computing nodes and a processor. The cluster includes a plurality of first nodes, each of which has a storage, and a plurality of second nodes, each of which has a storage. The storage of the respective second nodes has a higher access speed than the storage of the respective first nodes. The processor is configured to split input data into partitions of the input data, detect if any of the partitions has data skew, and assign the partitions having no data skew to the first nodes, and assign the partitions having the data skew to the second nodes, for parallel processing.

In certain embodiments, the ratio of the number of the second nodes to the total number of first and second nodes is less than 10% and preferably less than 5%. In certain embodiments, the ratio is about 1%.

In certain embodiments, the storage of each of the second nodes is comparable to a memory used by the second node in terms of access speed.

In certain embodiments, the storage of each of the second nodes is applicable as a temporally extended memory for the computing resource of the second node.

In certain embodiments, the storage of the respective second nodes includes at least one of Non-Volatile Memory express (NVMe), Optane Solid State Disk (SSD), or a persistent memory.

In certain embodiments, the processor is configured to determine a fraction of the partitions as having the data skew at least partially based on a ratio of a number of the second nodes to a total number of the first and second nodes. In certain embodiments, the processor is a master process in a node within the cluster, which is configured to manage the first and second nodes.

In certain embodiments, the processor is configured to determine top ones of a list of the partitions sorted in a descending order in terms of data amount as having the data skew based on the fraction. In certain embodiments, the fraction is in a range of 1%-10%, and the ratio is in a range of 1%-10%.

In certain embodiments, the processor is configured to process the input data based on a Map-Shuffle-Reduce (MapReduce) style, and the data amount is represented by at least one of a number of key-value pairs included in the partition and a size of the partition.

In certain embodiments, the processor is further configured to apply a weighting factor in evaluating the data amount. In certain embodiments, the weighting factor is in arrange of 2-20. In certain embodiments, the weighting factor is in a range of 5-10.

In certain embodiments, the processor is further configured to set a lower bound for the data amount, and to determine the partition as having no data skew if the data amount of the partition is no more than the lower bound.

In certain embodiments, the processor is further configured to set a lower bound for the number of key-value pairs at least partially based on a predetermined data size divided by a typical size of the key-value pair, and/or to set a lower bound for the partition size at least partially based on the predetermined data size, wherein the predetermined data size indicates one that will not significantly deteriorate the first node if being processed on the first node. For example, the predetermined data size is in a range of 2 GB-4 GB.

In certain embodiments, the processor is configured to check data skew using the formula: max (N_factor*N_percentile(percentage), lower_bound). N_factor is a predetermined factor based on the job and the cluster, and may be in a range of about 5-10. The N_percentile (percentage) is the number of key value pairs at the percentage rank, where the percentage rank is the sequence of the partitions from high to low based on the number of key-value pairs. In certain embodiments, the percentage is at about 90%-95% or more. In certain embodiment, the percentage is about 99%. lower_bound is a predetermined number of key-value pairs, which could be estimated by dividing a predetermined partition size without obvious performance degradation (such as 2 GB or 4 GB) by an average key-value size (such as 20 bytes), and may be in a range of about 10 million to 20 million. Once the value of the max(N_factor*N_percentile(percentage), lower_bound), the partitions having data size equals to or greater than that value is determined as partitions having data skew (or partitions likely to have data skew).

In certain embodiments, the processor is configured to check data skew using the formula: max (S_factor*S_percentile(percentage), lower_bound size). S_factor is a predetermined factor based on the job and the cluster, and may be in a range of about 5-10. The S_percentile(percentage) is the size of the partition at the percentage rank, where the percentage rank is the sequence of the partitions from high to low based on the data size. In certain embodiments, the percentage is at about 90%-95% or more. In certain embodiment, the percentage is about 99%. lower_bound is a predetermined data size, which could be estimated based on the cluster and the feature of the input data, and may be in a range of about 2 GB-4 GB. Once the value of the max(S_factor*S_percentile(percentage), lower_bound), the partitions having data size equals to or greater than that value is determined as partitions having data skew (or partitions likely to have data skew).

In certain embodiments, the processer further assigns the partitions determined as having data skew using any of the above two formula to the second nodes, and assigns the partitions determined as having no data skew to the first nodes, for parallel processing. Further, after the parallel processing, the processer, which may be a processor of a master node in the cluster, reduces the results from the parallel processing, to get the final result of the job.

In another aspect, the present disclosure relates to a method of handling data skew at run time. The method includes:

splitting, by a processor, input data into partitions of the input data;

detecting, by a processor, if any of the partitions has data skew; and assigning, by a processor, the partitions having no data skew to first nodes of a cluster of computing nodes, and the partitions having the data skew to second nodes of the cluster, for parallel processing, wherein each of the first nodes has a storage, and each of the second nodes has a storage, and the storage of the respective second nodes has a higher access speed than the storage of the respective first nodes.

In certain embodiments, the step of detecting if any of the partitions has data skew includes determining a fraction of the partitions as having the data skew at least partially based on a ratio of a number of the second nodes to a total number of the first and second nodes.

In certain embodiments, the step of detecting if any of the partitions has data skew includes determining top ones of a list of the partitions sorted in a descending order in terms of data amount as having the data skew based on the fraction.

In certain embodiments, the method is based on a MapReduce method, and the data amount is represented by at least one of a number of key-value pairs included in the partition or a size of the partition.

In certain embodiments, the method further includes applying a weighting factor in evaluating the data amount.

In certain embodiments, the method further includes setting a lower bound for the data amount, and to determine the partition as having no data skew if the data amount of the partition is no more than the lower bound.

In certain embodiments, the method further includes extending a memory space for at least one of the second nodes by using the storage of the second node.

In another aspect, the present disclosure relates to non-transitory computer readable medium storing computer executable code. The computer executable code, when executed at a processor, is configured to:

split input data into partitions of the input data;

detect if any of the partitions has data skew; and assign the partitions having no data skew to first nodes of a cluster of computing nodes, and the partitions having the data skew to second ones of the cluster, for parallel processing, wherein each of the first nodes has a storage, and each of the second nodes has a storage, and wherein the storage of the respective second nodes has a higher access speed than the storage of the respective first nodes.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present disclosure is directed to a Big Data framework. In the framework, input data is split into partitions of the input data, and the data partitions are assigned to a cluster of computing nodes for parallel processing. The cluster includes one or more first nodes, and one or more second nodes whose storage has a higher access speed than that of the first nodes. The framework also includes a data skew detection mechanism. The mechanism can detect any of the partitions where data skew is likely to occur. As a result of the detection, those partitions that are determined as having the data skew can be assigned to the second nodes. Therefore, the skewed partitions can be processed in a relatively fast speed, and thus influences caused by the data skew can be suppressed.

Figure 1:
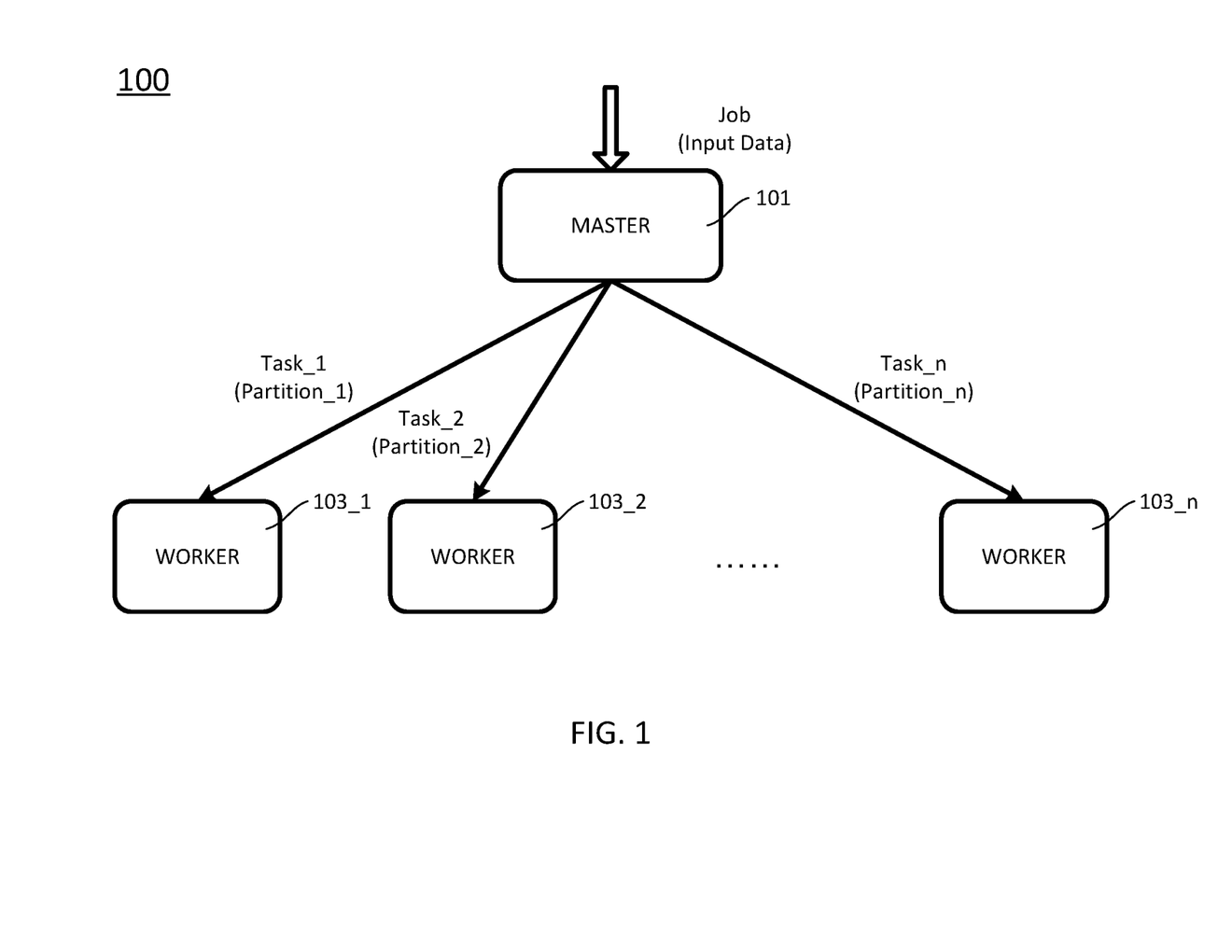
FIG. 1 schematically depicts task scheduling in a Big Data framework according to certain embodiments of the present disclosure.

FIG. 1 schematically depicts task scheduling in a Big Data framework according to certain embodiments of the present disclosure. As shown in FIG. 1, the framework 100 is configured to handle input data, and includes a master 101, and a plurality of workers 103_1, 103_2, . . . , 103_n (collectively referred to as "103"). In certain embodiments, each of the master 101 and the workers 103 is a process in a node of a cluster or a grid, and the master 101 and the workers 103 uses a MapReduce model to process or generate big data sets. In certain embodiments, each of the master 101 and the workers 103 may be a computing device or a service run on the computing device. In certain embodiments, one computing device may have one or more workers 103 based on the computing resources, such as central processing unit (CPU) and memory the computing device includes. In certain embodiments, the MapReduce model includes a mapping phase, a shuffling phase, and a reduce phase. In the mapping stage, the master 101 divides a job or documents to the workers 103; in the shuffling phase, the master 101 sorts the result based on the key/value pairs; and in the reduce stage, the mast 101 merges the results from the workers 103, and stores specific result in one of the workers 103.

The master 101 coordinates operations in the framework 100, for example, scheduling tasks among the workers 103. Specifically, the master 101 can be requested to execute a job and receive input data associated with the job. For example, the job can be machine learning, and the input data can be historical data. By the machine learning, some knowledge can be learned from the historical data. In a case of online shopping, the historical data can be historical sales data in a past period, and the knowledge learned therefrom can be used for sales prediction, smart recommendation, or the like.

In order for parallel processing, the master 101 divides the requested job into a plurality of tasks (Task_1, Task_2, . . . , Task_n) which can be executed in parallel, and also splits the input data into a plurality of partitions (Partition_1, Partition_2, . . . , Partition_n) associated with the respective tasks. The master 101 assigns the respective tasks and the respective partitions associated therewith to the respective workers 103, so that those tasks can be executed at the respective workers 103 in parallel, to speed up the execution of the job.

Although not shown, the workers 103 can return results of executing the respective tasks to the master 101, and the master 101 can aggregate the respective results from the workers 103 into a result of executing the job.

The master 101 and the workers 103 can be processes running in a synchronous distributed computing environment, for example, a cloud. The distributed computing environment includes a plurality of computing nodes, and the master 101 and the workers 103 can be running on separate nodes in the environment. For example, each of the workers 103 can be running on a corresponding one of the nodes, and different ones of the workers can be running on different ones of the nodes. In certain embodiments, one node may include more than one workers 103.

In the above described framework 100, the execution time of the job mainly depends on the longest execution time of the respective tasks on the respective workers 103. This is because the execution result of the job cannot be derived unless all the tasks are finished.

If a particular one of the tasks has a relatively greater data partition associated therewith than the remaining tasks, then generally it will take more time for the corresponding worker to execute this task. This phenomenon is named "data skew." The data skew significantly affects the execution time of the job. In certain embodiments, the master 101 can adaptively schedule the respective tasks to the respective workers 103 based on where there is data skew or not.

Figure 2:
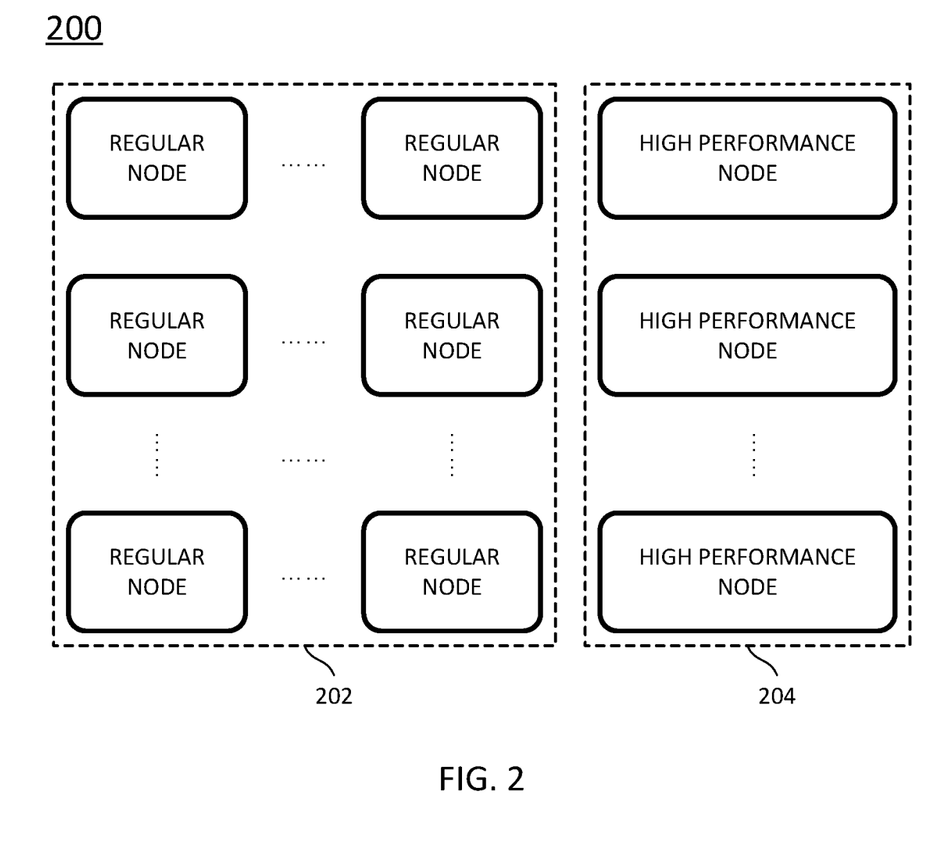
FIG. 2 schematically depicts a system infrastructure according to certain embodiments of the present disclosure.

FIG. 2 schematically depicts a system infrastructure according to certain embodiments of the present disclosure. As shown in FIG. 2, the infrastructure 200 includes a cluster of computing nodes, or nodes.

Each of the nodes is a computing platform, such as a computer, a server, a workstation, or the like. Each of the nodes has its computing resources, such as Central Processing Unit (CPU), to do various computing to execute a task assigned to this node. Further, each of the nodes has its storage device to store, for example, the assigned task, a data partition assigned to this node, and results of executing the assigned task.

Furthermore, each of the nodes has its memory, such as Read Only Memory (ROM) or Random Access Memory (RAM), to load the assigned task and store, for example, intermediate results of executing the task. Generally, the memory has a higher access speed than the storage device.

The nodes can be interconnected with each other in either a wired manner or a wireless manner. Preferably, the nodes are inter-connected via, for example wired local area network, to achieve high speed communication. In some embodiments, the interconnection among the nodes may include wired or wireless communication links, fiber, cable, or the like. In some embodiments, the interconnection may include at least one of Internet, Local Area Network (LAN), Wide Area Network (WAN), or cellular telecommunications network.

In certain embodiments, the nodes can be classified into regular nodes 202 and high performance nodes 204 based on at least performances of their respective storage devices. For example, the high performance node 204 has a higher access speed than the regular node 202. In some embodiments, the storage device of the regular node 202 includes a regular storage device, such as Hard Disk Drive (HDD), Solid State Drive (SSD), or the like, and the storage device of the high performance node 204 includes a high performance storage device, such as Non-Volatile Memory express (NVMe), Optane SSD, or a persistent memory. In certain embodiments, the access speed (for example characterized by megabit per second) of the high performance node 204 is 5 times greater than that of the regular nodes 202. In certain embodiments, the access speed of the high performance node 204 is 100 times greater than that of the regular nodes 202. In certain embodiments, the access speed of the high performance node 204 is more than 1000 times greater than that of the regular nodes 202.

In certain embodiments, the storage device of the second node 204 is comparable to the memory of the second node 204 in terms of access speed. Here, the expression "be comparable to" may refer to being at the substantially same order of magnitude. Due to the high access speed, the high performance node 204 can temporarily extend its memory space by virtual of the storage device. By including the high performance storage device, it is possible to improve the computing capability of the high performance node 204.

In certain embodiments, a ratio of the high performance nodes 204 in all the nodes is relatively low, to keep the cost of the infrastructure 200 as low as possible. In other embodiments, the ratio of the high performance nodes 204 can be in a range of 0.1%-20%, to accommodate the requirements of certain tasks. In certain embodiments, the ratio is about 5%-10%. In certain embodiments, the ratio is 1% or less.

In certain embodiments, a data partition, which has a relatively large data amount and thus is more likely to have data skew, is scheduled to the high performance node 204. Therefore, processing of the data partition can be speeded up by the improved computing capability of the high performance node 204.

Figure 3:
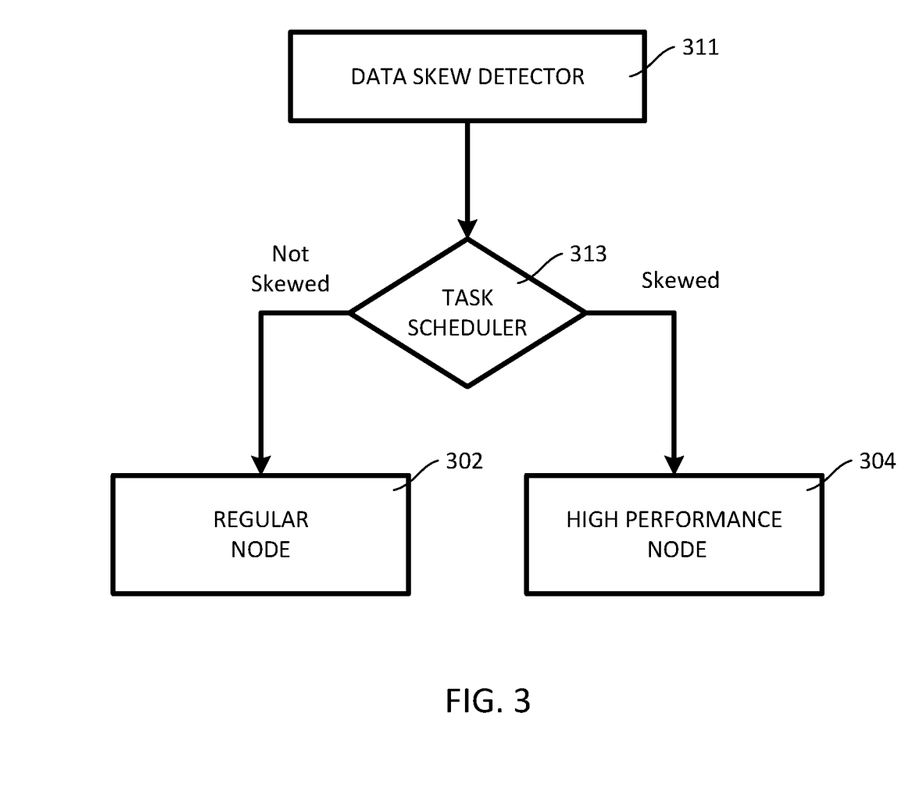
FIG. 3 schematically depicts skew based task scheduling according to certain embodiments of the present disclosure.

FIG. 3 schematically depicts skew based task scheduling according to certain embodiments of the present disclosure. In FIG. 3, blocks 311 and 313 may be hardware modules included in a node, for example, one on which the master resides on, or software components running on the node, or a combination of hardware and software.

The data skew detector 311 receives input data, specifically, partitions of the input data, and in response to receiving the partitions of the input data, detects if any of the data partitions has data skew. The principle of detecting the data skew will be described in detail hereinafter. The data skew detector 311 passes the respective partitions, together with their respective detection results, to the task scheduler 313. For example, the data skew detector 311 can add a flag or label to each of the partitions, which flag or label indicating whether the partition has data skew or not.

In response to receiving the partitions and the detection result, the task scheduler 313 assigns those of the partitions, which are detected by the data skew detector 311 as having no data skew, to regular nodes 302, and assigns those of the partitions, which are detected by the data skew detector 311 as having data skew, to high performance nodes 304, respectively. For details of the nodes 302 and 304, reference may be made to the above descriptions in conjunction with FIG. 2.

Figure 4:
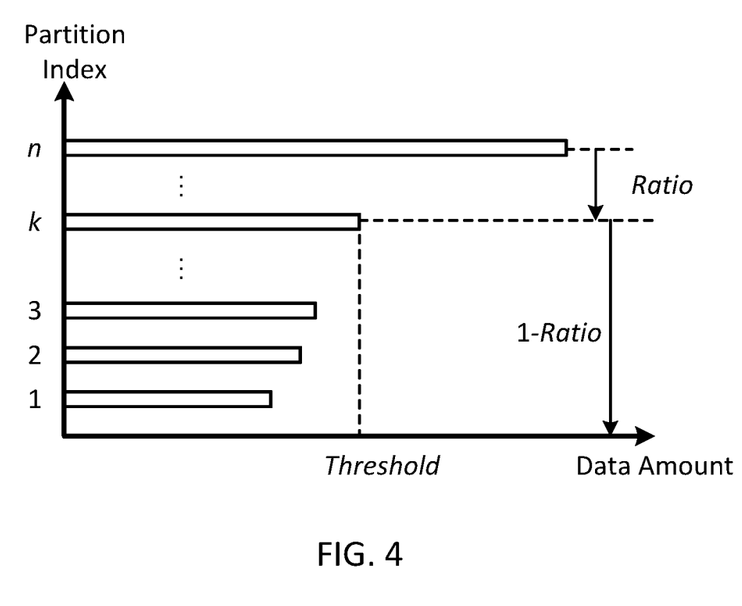
FIG. 4 schematically depicts a principle of data skew detection according to certain embodiments of the present disclosure.

FIG. 4 schematically depicts the principle of data skew detection according to certain embodiments of the present disclosure. As shown in FIG. 4, the partitions may be sorted according to their respective data amount. In the example shown in FIG. 4, Partition 1 has the lowest data amount, Partition 2 has the next lowest data amount, . . . , and Partition n has the highest data amount. The data amount can be evaluated based on one or more metrics. In some embodiments, the data amount can be evaluated based on the size of the respective partitions. In some embodiments, the input data are processed based on a MapReduce method, and are handled in the form of key-value pairs. In this case, the data amount can be evaluated based on a number of key-value pairs in the respective partitions.

In principle, because there is a Ratio, for example, 10%, of the nodes are high performance nodes, a fraction, not greater than the Ratio, of the partitions can be assigned to the high performance nodes for quick processing. In this example, top 10% of the partitions can be assigned to the high performance nodes.

More specifically, as shown in FIG. 4, a partition ranked at the Ratio (here, Partition k) can be determined, and thus the data amount of the determined partition can be set as a Threshold. Here, the expression Partition k ranked at the Ratio in all the n partitions means that a ratio of the number of partitions from Partition k to Partition n to the total number of the nodes, n, is substantially identical to the Ratio, or in other words, k=[n*(1−Ratio)], where "[ ]" indicates a round operation. In some embodiments, a partition whose data amount is greater than the Threshold can be determined as having data skew.

Figure 5:
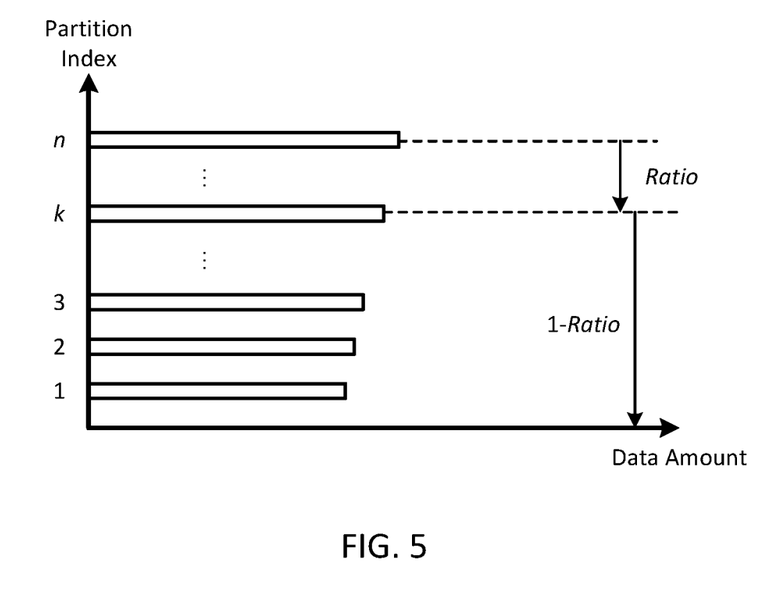
FIG. 5 schematically depicts a distribution of data amounts of partitions according to another embodiment.

Further, the data skew is dependent on the difference in the data amount among the partitions, not on the data amount per se. A great data amount means a relatively high possibility, but not necessity, of the data skew. FIG. 5 schematically depicts a distribution of data amounts of the respective partitions according to another embodiment. As shown in FIG. 5, there is no significant difference in data amount among the respective partitions. This means that there is no data skew or no significant data skew. In such a case, there is no need to assign a fraction of the partitions based on the Ratio to the high performance nodes, because generally high performance means high costs, such as, high power consumption or the like.

To focus on the difference in data amount, not the data amount per se, in certain embodiments, the system applied a weighting factor in evaluating the data amount. In some embodiments, the weighting factor is greater than 1 (one), to make the difference more remarkable. Therefore, the above Threshold can be updated to Threshold*Weighting Factor, and accordingly a partition whose data amount is greater than the Threshold*Weighting Factor can be determined as having data skew.

Furthermore, even if there is a significant difference in data amount among the respective partitions, there will be no data skew or no significant data skew when all the partitions have relatively small data amounts. In some embodiments, a lower bound may be set, and only a partition whose data amount is greater than the lower bound (and also satisfies the Threshold*Weighting Factor rule) can be determined as having data skew.

Figure 6:
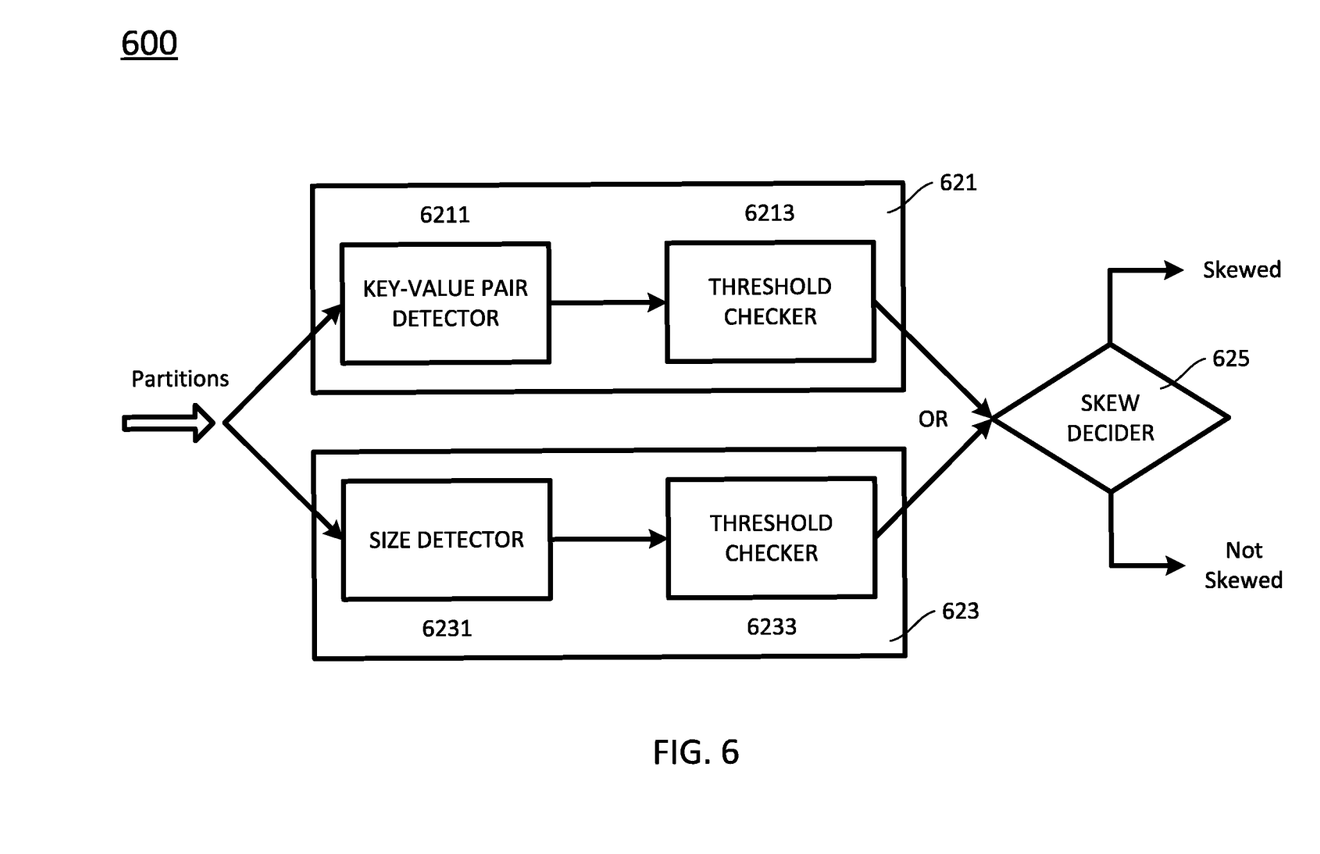
FIG. 6 schematically depicts a configuration of a data skew detector according to certain embodiments of the present disclosure.

FIG. 6 schematically depicts a configuration of a data skew detector according to certain embodiments of the present disclosure. As shown in FIG. 6, the data skew detector 600 includes one or more of blocks 621 and 623. The blocks 621 and 623 may be hardware modules included in a node, for example, one on which the master resides on, or software components running on the node, or a combination of hardware and software.

The block 621 is configured to evaluate the data amount in terms of a number of key-value pairs. The block 621 includes a key-value pair detector 6211 and a threshold checker 6213. The key-value pair detector 6211 detects a number of key-value pairs in each of the partitions. The threshold checker 6213 checks whether the number of key-values pars in each of the partitions exceeds a threshold or not. The threshold may be determined as described above. In certain embodiments, the threshold checker 6213 sets the threshold as max(N_factor*N_percentile(percentage), lower_bound), that is, the bigger one of N_factor*N_percentile (percentage) and lower_bound. N_factor indicates a weighting factor for key-value numbers, for example, in a range of about 1-100, preferably 2-20, and more preferably 5-10. N_percentile(percentage) indicates a number of key-value pairs included in a partition ranked at the percentage. For example, N_percentile(90%) means that the partitions are ranked from high to low based on the number of key-value pairs in each partition; for the 90% partition (at 90% or most close to 90%), about 10% of the partitions have more key-value pairs than the partition at the 90% percentage, and about 90% of the partitions have less key-value pairs than the partitions at the 90% percentage. In certain embodiment, the percentage is determined by: number of regular workers (or nodes)/total number of workers. In certain embodiments, the percentage is determined to be less than the number of regular workers/total number of workers. lower_bound (key-value pair lower_bound) indicates a preset lower bound. In some embodiments, the lower bound can be set at least partially based on a predetermined data size divided by a typical size of the key-value pair. The predetermined data size indicates one that will not significantly deteriorate the regular node if being processed on the regular node, for example, 2 GB-4 GB. In certain embodiments, a key-value pair may occupy a size of 40 byte, and the lower_bound can be in a range of 10 million-20 million of key value pairs calculated by: 2 GB-4 GB/40 bytes.

The following is an example of determining the threshold. Let the percentage be 0.7. In the distribution shown in Table 1, there are 5 partitions, and the 5 partitions are ranked high to low based on the number of key-values pairs they include. The rank then is partition 5 (30 million, 80%-100%), partition 4 (4 million, 60%-80%), partition 3 (3 million, 40%-60%) partition 2 (2 million, 20%-40%) partition 1 (1 million, 0%-20%). The N_percentile(0.7) will be the number of key-value pairs included in Partition 4 which ranked at 0.7 (in the range of 60%-80%), i.e., 4 million. If N_factor=5 and lower_bound=10 million, then the threshold will be max (5*4 million, 10 million)=20 million. Thus, Partition 5 will be detected as exceeding the threshold (and thus having data skew).

TABLE 1

|  | Partition # | | | | |
| --- | --- | --- | --- | --- | --- |
|  | 1 | 2 | 3 | 4 | 5 |
| Number of key-value pairs | 1 million | 2 million | 3 million | 4 million | 30 million |

The block 623 is configured to evaluate the data amount in terms of partition size. The block 623 includes a size detector 6231 and a threshold checker 6233. The size detector 6231 detects a size of each of the partitions. The threshold checker 6233 checks whether the size of each of the partitions exceeds a threshold or not. The threshold may be determined as described above. In certain embodiments, the threshold checker 6233 set the threshold as max (S_factor*S_percentile(percentage), lower_bound), that is, the bigger one of S_factor*S_percentile(percentage) and lower_bound. S_factor indicates a weighting factor for partition size, for example, one in a range of about 1-100, preferably 2-20, and more preferably 5-10. S_percentile (percentage) indicates the size of a partition ranked at the percentage. For example, S_percentile(90%) means that the partitions are ranked from high to low based on the data size of each partition; for the 90% partition (at 90% or most close to 90%), about 10% of the partitions have a data size greater than the data size of the partition at the 90% percentage, and about 90% of the partitions have a data size less than the data size of the partitions at the 90% percentage. In certain embodiment, the percentage is determined by: number of regular workers (or nodes)/total number of workers. In certain embodiments, the percentage is determined to be less than the number of regular workers/total number of workers. lower_bound (data size lower_bound) indicates a preset lower bound. In some embodiments, the lower bound can be set at least partially based on a predetermined data size. The predetermined data size indicates one that will not significantly deteriorate the regular node if being processed on the regular node, for example, 2 GB-4 GB. Therefore, the lower_bound may be in a range of 2 GB-4 GB, for example.

The following is an example of determining the threshold. Let the percentage be 0.7. In the distribution shown in Table 2, there are 5 partitions, and the 5 partitions are ranked high to low based on the data size. The rank then is partition 5 (50 GB, 80%-100%), partition 4 (1.8 GB, 60%-80%), partition 3 (1.7 GB, 40%-60%) partition 2 (1.5 GB, 20%-40%) partition 1 (1 GB, 0%-20%). The S_percentile(0.7) will be the size Partition 4 which ranked at 0.7 (in the range of 60%-80%), i.e., 1.8 GB. If S_factor=5 and lower_bound=4 GB, then the threshold will be max (5*1.8 GB, 4 GB)=9 GB. Thus, Partition 5 will be detected as exceeding the threshold (and thus having data skew).

TABLE 2

| | Partition # | | | | |
|---|---|---|---|---|---|
| | 1 | 2 | 3 | 4 | 5 |
| Size | 1 GB | 1.5 GB | 1.7 GB | 1.8 GB | 50 GB |

The data skew detector 600 further includes a skew decider 625. The skew decider 625 indicates "no data skew" if both the threshold checker 6213 and the threshold checker 6233 indicate no threshold being exceeded, and indicates "data skew" if at least one of the threshold checker 6213 and the threshold checker 6233 indicate threshold being exceeded. When the skew decider 625 decides that partitions having data skew exist, it then assigns those partitions to the high performance node 204.

Figure 7:
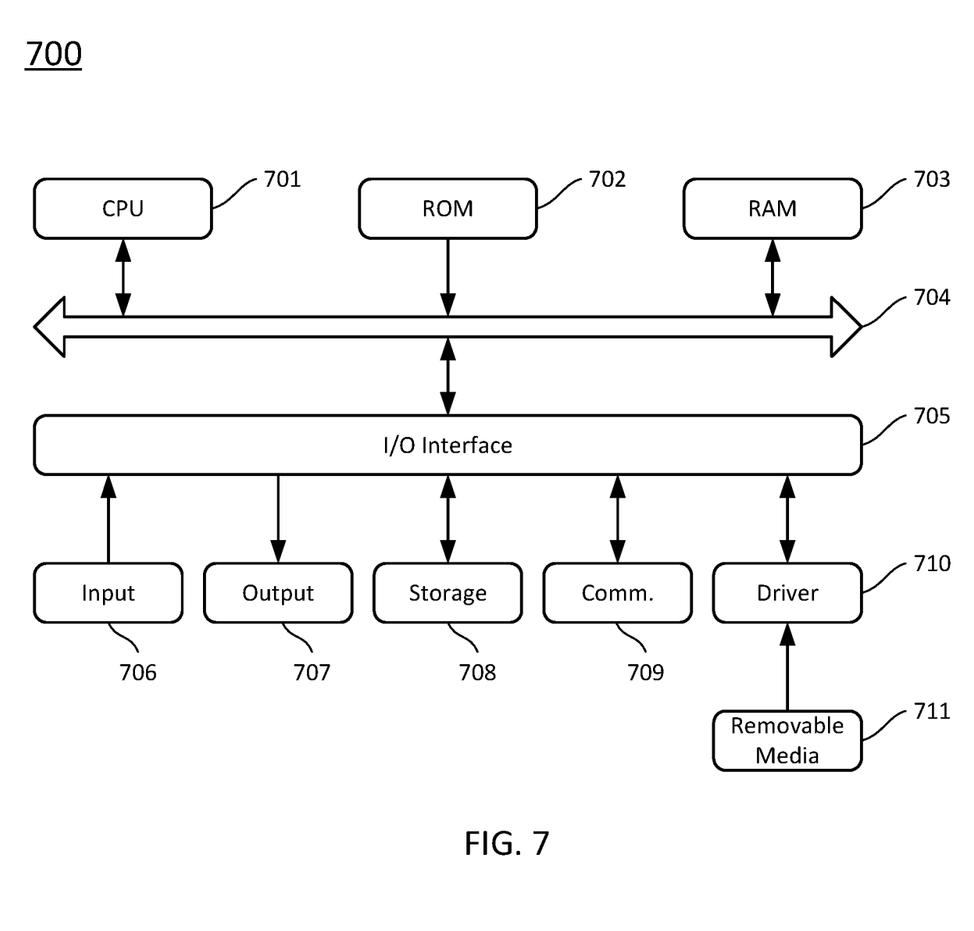
FIG. 7 schematically depicts a computing node according to certain embodiments of the disclosure.

FIG. 7 schematically depicts a computing node according to certain embodiments of the present disclosure. As shown in FIG. 7, the computing node 700 includes a Central Processing Unit (CPU) 701. The CPU 701 is configured to perform various actions and processes according to programs stored in a Read Only Memory (ROM) 702 or loaded into a Random Access Memory (RAM) 703 from storage 708. The RAM 703 has various programs and data necessary for operations of the computing node 700. The CPU 701, the ROM 702, and the RAM 703 are interconnected with each other via a bus 704. Further, an I/O interface 705 is connected to the bus 704.

In certain embodiments, the computing node 700 further includes at least one or more of an input device 706 such as keyboard or mouse, an output device 707 such as Liquid Crystal Display (LCD), Light Emitting Diode (LED), Organic Light Emitting Diode (OLED) or speaker, the storage 708 such as Hard Disk Drive (HDD), and a communication interface 709 such as LAN card or modem, connected to the I/O interface 705. The communication interface 709 performs communication through a network such as Internet. In certain embodiments, a driver 710 is also connected to the I/O interface 705. A removable media 711, such as HDD, optical disk or semiconductor memory, may be mounted on the driver 710, so that programs stored thereon can be installed into the storage 708.

In certain embodiments, the process flow described herein may be implemented in software. Such software may be downloaded from the network via the communication interface 709 or read from the removable media 711, and then installed in the computing node. The computing device 700 will execute the process flow when running the software.

Figure 8:
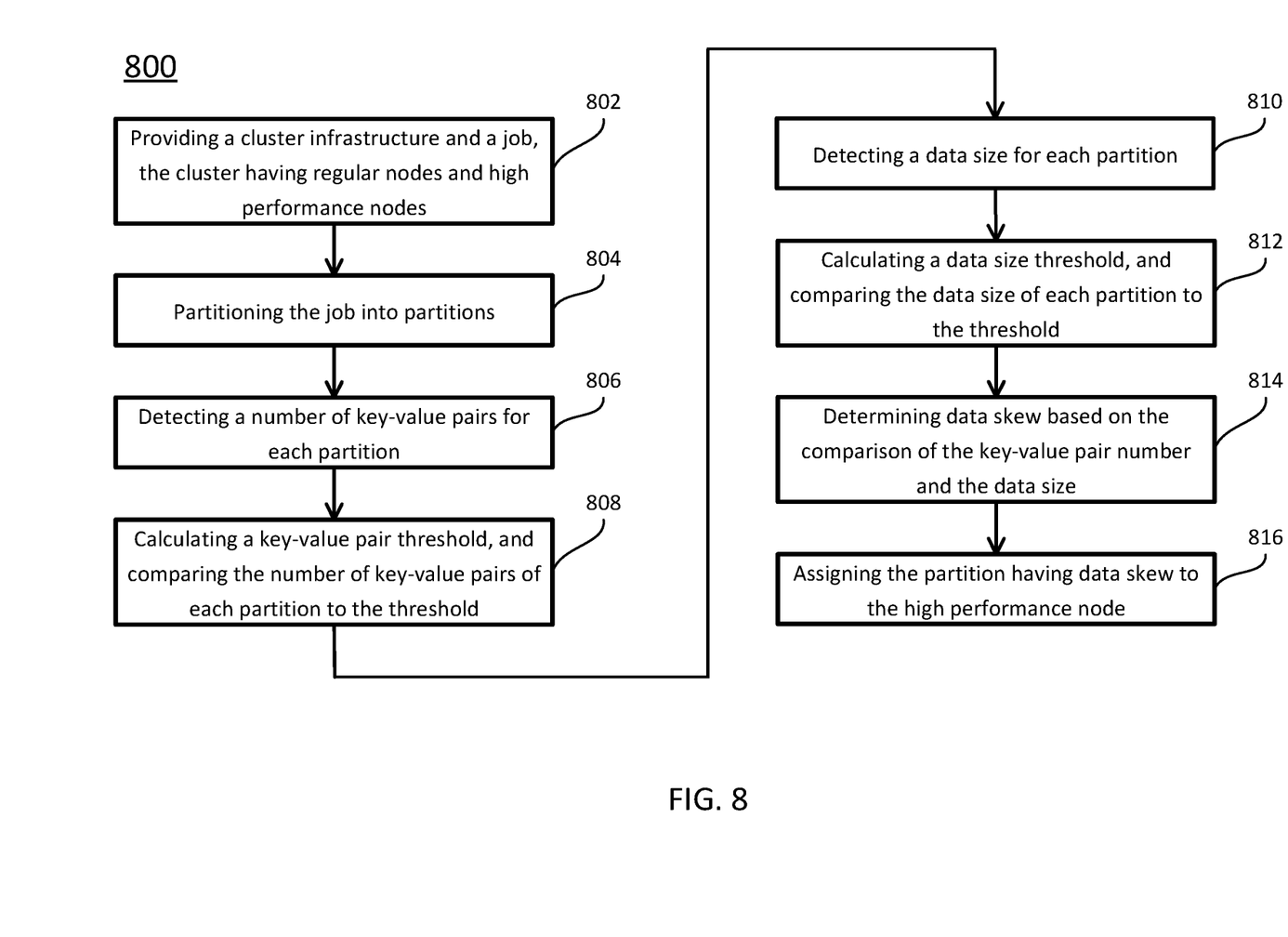
FIG. 8 schematically depicts a method for handling data skew in Big Data frameworks according to certain embodiments of the present disclosure.

FIG. 8 schematically shows a method for handling data skew in Big Data frameworks according to certain embodiments of the present disclosure. In certain embodiments, the method is implemented by the computing node 700 shown in FIG. 7. It should be particularly noted that, unless otherwise stated in the present disclosure, the steps of the method may be arranged in a different sequential order, and are thus not limited to the sequential order as shown in FIG. 8.

As shown in FIG. 8, at procedure 802, a job is provided to a cluster infrastructure. The cluster includes a master node 101 and a plurality of workers 103, and the workers 103 includes regular nodes 202 and high performance node 204. The job is a Big Data work, and the Big Data may be distributed through the workers 103.

At procedure 804, a partition module of the master node 101 partitions the job into tasks or partitions, and send the partitions or partition information respectively to the key-value pair detector 6211 and the size detector 6231.

At procedure 806, upon receiving the partitions, the key-value pair detector 6211 detects the number of key-value pairs in each of the partitions, and sends the number of key-value pairs to the threshold checker 6213.

At procedure 808, upon receiving the number of key-value pairs, the threshold checker 6213 calculates a key-value pair threshold, compares the number of key-value pairs to the key-value pair threshold, and sends the comparison result to the skew decider 625. In certain embodiments, the threshold checker 6213 calculates the key-value pair threshold using the formula max (N_factor*N_percentile(percentage), lower_bound), that is the number of N_factor*N_percentile(percentage) and lower_bound whichever is greater than the other.

At procedure 810, upon receiving the partitions, the size detector 6231 detects the data sizes of the partitions, and sends the data sizes to the threshold checker 6233.

At procedure 812, upon receiving the sizes, the threshold checker 6233 calculates a data size threshold, compares the data sizes of the partitions to the data size threshold, and sends the comparison result to the skew decider 625. In certain embodiments, the threshold checker 6233 calculates the data size threshold using the formula max (S_factor*S_percentile(percentage), lower_bound size), that is the number of S_factor*S_percentile(percentage) and lower_bound size whichever is greater than the other.

At procedure 814, upon receiving the comparison result from the threshold checker 6213 and the threshold checker 6233, the skew decider 625 determines, for each partition, whether the number of key-value pairs equals to or is greater than the number threshold or whether the size of the partition equals to or is greater than the size threshold. If any of the key-value pair number or the size of a partition equal or are greater than the number threshold or the size threshold, the skew decider 625 determines that the partition is likely to have data skew. If both the key-value pair number and the size of a partition are respectively less than the number threshold or the size threshold, the skew decider 625 determines that the partition is unlikely to have data skew.

At procedure 816, the master node 101 assigns the partitions that are likely to have data skew to the high performance node 204, and assigns the partitions that are unlikely to have data skew to the regular node 202.

In certain embodiments, the method 800 may further includes receiving the result from the workers 103, and combine the results to have the final results for the job.

Figure 9:
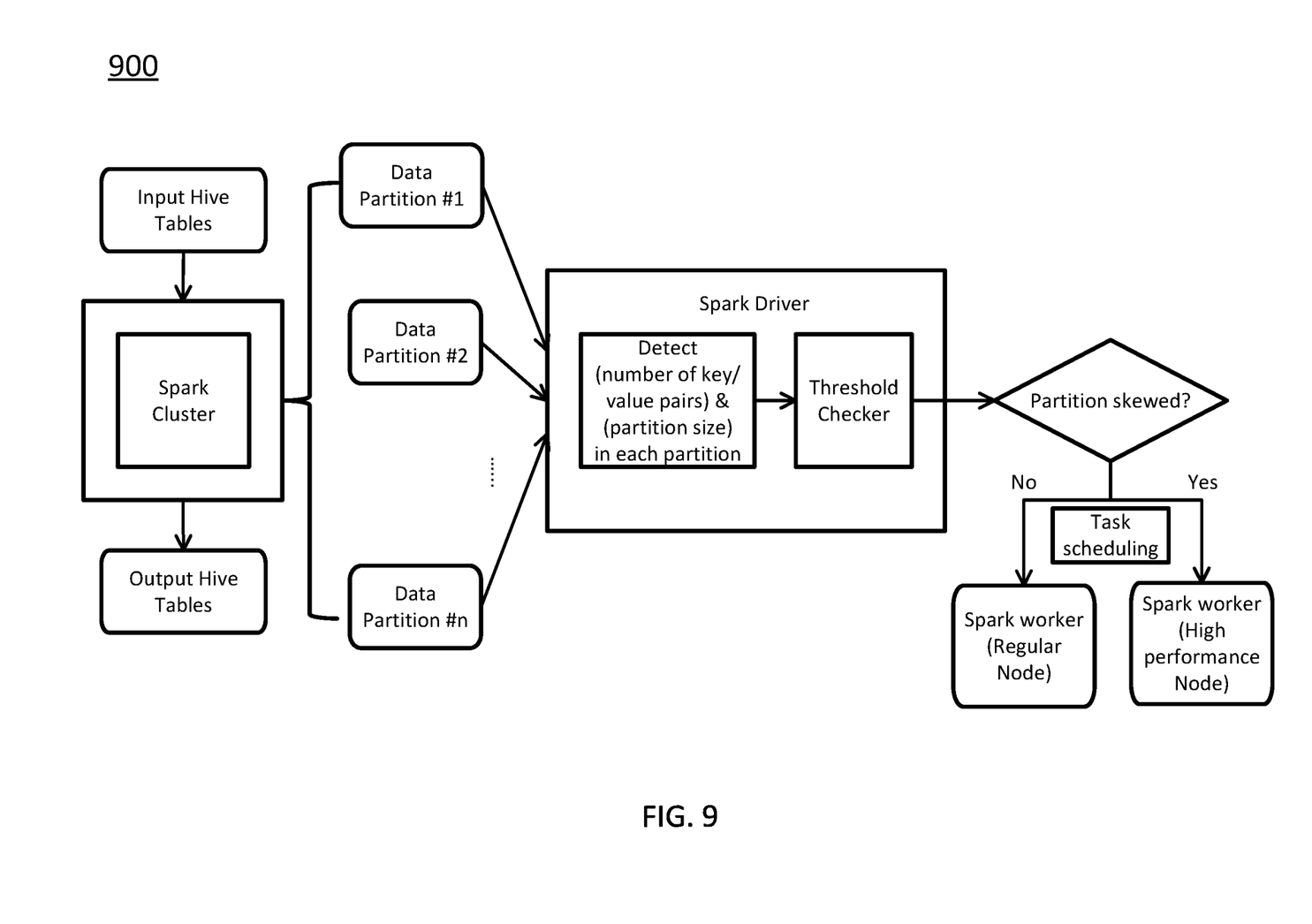
FIG. 9 schematically shows an example of using a system according to certain embodiments of the present disclosure under a Spark SQL environment.

FIG. 9 schematically shows an example of using a system according to certain embodiments of the present disclosure. As shown in FIG. 9, the system is used under a Spark SQL environment.

In a further aspect, the present disclosure is related to a non-transitory computer readable medium storing computer executable code. The code, when executed at one or more processer of the system, may perform the method as described above. In certain embodiments, the non-transitory computer readable medium may include, but not limited to, any physical or virtual storage media.

In summary, certain embodiments of the present disclosure, among other things, have the following advantages: (1) The system can solve data skew for Big Data at run time, which prevents the possible data skew beforehand; (2) The system can speed up Big Data application without upgrading all nodes in data center; (3) The system can speed up Big Data application using cheaper high performance storage device compare to memory; (4) The system can support most of Big Data framework, such as Apache Hadoop®, Apache Spark® and Apache Flink® etc.; (5) The system can solve the problem of unexpected changes such as data size changes in Big Data processing; (5) The system doesn't need to delete any data for solving data skew problem; (5) The system doesn't need to understand the application logic and the cause of data skew to solve the data skew problem.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Gufler, B., Augsten, N., Reiser, A. and Kemper, A., Handling Data Skew in MapReduce, Closer'11, 2011, pp. 574-583.
2. Xu, Y and Kostamaa, P, A new algorithm for small-large table outer joins in parallel DBMS, IEEE 26th Int. Conf. Data Engineering, 2010, pp. 1018-1024.
3. Cheng, L., and Kotoulas, S, Efficient skew handling for outer joins in a cloud computing environment, IEEE Transactions on Cloud Computing, 2015.

What is claimed is:

1. A system, comprising:
  a cluster of computing nodes, comprising a plurality of first nodes and a plurality of second nodes, wherein each of the first and second nodes has a storage, and the storage of the respective second nodes has a higher access speed than the storage of the respective first nodes; and
  a processor, configured to split input data into partitions, detect if any of the partitions has data skew, assign the partitions having no data skew to the first nodes, and assign the partitions having data skew to the second node, for parallel processing,
  wherein the processor is configured to detect if any of the partitions has data skew by: determining a fraction of the partitions as having the data skew at least partially based on a ratio of a number of the second nodes to a total number of the first and second nodes.

2. The system of claim 1, wherein the storage of each of the second nodes is comparable to a memory used by the second node in terms of access speed.

3. The system of claim 1, wherein the storage of each of the second nodes is applicable as a temporally extended memory for computing resource of the second node.

4. The system of claim 1, wherein the storage of the respective second nodes comprises at least one of Non-Volatile Memory express (NVMe), Optane Solid State Disk (SSD), or a persistent memory.

5. The system of claim 1, wherein the fraction is in a range of 1%-10%, and the ratio is in a range of 1%-10%.

6. The system of claim 1, wherein the processor is configured to determine top ones of a list of the partitions sorted in a descending order in terms of data amount as having the data skew based on the fraction.

7. The system of claim 6, wherein the processor is configured to process the input data based on a map-shuffle-reduce (MapReduce) style, and the data amount comprises is represented by at least one of a number of key-value pairs included in the partition and a size of the partition.

8. The system of claim 7, wherein the processor is further configured to apply a weighting factor in evaluating the data amount.

9. The system of claim 8, wherein the weighting factor is in a range of 5-10.

10. The system of claim 7, wherein the processor is further configured to set a lower bound for the data amount, and to determine the partition as having no data skew if the data amount of the partition is no more than the lower bound.

11. The system of claim 10, wherein the processor is further configured to set a lower bound for the number of key-value pairs at least partially based on a predetermined data size divided by a typical size of the key-value pair, and to set a lower bound for the partition size at least partially based on the predetermined data size, wherein the predetermined data size indicates one that will not significantly deteriorate the first node if being processed on the first node.

12. The system of claim 11, wherein the predetermined data size is in a range of 2 GB-4 GB.

13. A method, comprising:
splitting, by a processor, input data into partitions;
detecting, by the processor, if any of the partitions has data skew; and
assigning, by the processor, the partitions having no data skew to first nodes of a cluster of computing nodes, and the partitions having the data skew to second nodes of the cluster, for parallel processing,
wherein each of the first and second nodes has a storage, and the storage of the respective second nodes has a higher access speed than the storage of the respective first nodes; and
wherein the step of detecting if any of the partitions has data skew comprises: determining a fraction of the partitions as having the data skew at least partially based on a ratio of a number of the second nodes to a total number of the first and second nodes.

14. The method of claim 13, wherein the step of detecting if any of the partitions has data skew comprises: determining top ones of a list of the partitions sorted in a descending order in terms of data amount as having the data skew based on the fraction.

15. The method of claim 14, wherein the method is a MapReduce method, and the data amount is represented by at least one of a number of key-value pairs included in the partition or a size of the partition.

16. The method of claim 15, further comprising applying a weighting factor in evaluating the data amount.

17. The method of claim 15, further comprising setting a lower bound for the data amount, and determining the partition as having no data skew if the data amount of the partition is no more than the lower bound.

18. A non-transitory computer readable medium storing computer executable code, wherein the computer executable code, when executed at a processor, is configured to:
split input data into partitions;
detect if any of the partitions has data skew; and
assign the partitions having no data skew to first nodes of a cluster of computing nodes, and the partitions having data skew to second nodes of the cluster, for parallel processing,
wherein each of the first and second nodes has a storage, and the storage of the respective second nodes has a higher access speed than the storage of the respective first nodes; and
wherein the processor is configured to detect if any of the partitions has data skew by: determining a fraction of the partitions as having the data skew at least partially based on a ratio of a number of the second nodes to a total number of the first and second nodes.

* * * * *